United States Patent [19]

Omata

[11] Patent Number: 4,462,630
[45] Date of Patent: Jul. 31, 1984

[54] ASHTRAY DEVICE

[75] Inventor: Nobuaki Omata, Hiroshima, Japan

[73] Assignee: Nifco, Inc., Yokohama, Japan

[21] Appl. No.: 330,049

[22] Filed: Dec. 14, 1981

[30] Foreign Application Priority Data

Dec. 17, 1980 [JP] Japan .............................. 55-177119

[51] Int. Cl.³ .............................................. B60N 3/12
[52] U.S. Cl. .................................... 296/37.9; 49/379
[58] Field of Search ........................... 296/37.9, 37.12;
131/235; 49/379, 386; 312/242, 245, 246, 248

[56] References Cited

U.S. PATENT DOCUMENTS

| 816,792 | 4/1906 | Green et al. | 296/37.12 |
| 2,294,173 | 8/1942 | Gillisse | 296/37.9 |
| 3,094,237 | 6/1963 | Tsubosaka | 296/37.9 |
| 3,337,282 | 8/1967 | Groff et al. | 296/37.9 |
| 3,561,162 | 2/1971 | Goldman | 49/386 |
| 3,572,871 | 3/1971 | Bonnaud | 312/248 |
| 3,708,180 | 1/1973 | Bird | 296/37.9 |

FOREIGN PATENT DOCUMENTS

2733771 2/1979 Fed. Rep. of Germany ........ 49/386

Primary Examiner—Joseph F. Peters, Jr.
Assistant Examiner—Ross Weaver
Attorney, Agent, or Firm—Trexler, Bushnell & Wolters, Ltd.

[57] ABSTRACT

An ashtray device comprises an ashtray unit, a housing for accommodating the ashtray unit, energizing means disposed within the housing for energizing the ashtray unit in the direction of being opened, retaining means for keeping the ashtray unit in a closed state, and means for releasing the retaining means from the outside. By building the ashtray device into the dashboard of an automobile, for example, a driver is relieved of special care and allowed to devote all his attention to the operation of his automobile even during the use of the ashtray unit.

4 Claims, 13 Drawing Figures

Fig_1

Fig_2

Fig_8

Fig_10

Fig_9(C)

Fig_9(B)

Fig_9(A)

ASHTRAY DEVICE

BACKGROUND OF THE INVENTION

This invention relates to an ashtray device built into a panel, for example, into the dashboard of an automobile.

The ashtray devices installed near the driver's seat in cars have been improved in various minor ways, but the basic design that requires the ashtray to be manually pulled out at the time of use still persists. For drivers, the act of pulling out an ashtray while driving is fairly dangerous. While pulling out the ashtray, the driver is, of course, required to retain a hold on the steering wheel. More often than not, the driver keeps his burning cigarette between the fingers of the hand being used to pull out the ashtray. Not infrequently, ashes fall off the burning cigarette onto the floor as when the burning end of the cigarette is inadvertently hit against the front plate of the ashtray before the ashtray is pulled out. If a part of the burning portion at the tip of the cigarette happens to fall together with ashes, the floor carpet of the car may start to burn. The driver therefore has to look to see where the ashes have fallen and in doing so he takes his eyes off the road.

While the interiors of automobiles are increasingly luxurious, the ashtrays alone have remained little changed. From the standpoint of design and function, the conventional drawer type ashtrays have poor commercial value.

SUMMARY OF THE INVENTION

An object of this invention is to provide an ashtray device built into a panel which is brought into position for use by application of an instantaneous pressure to the ashtray.

To accomplish the object described above according to the present invention, there is provided an ashtray device so constructed that the ashtray unit thereof is stowed in a housing behind the panel where it is kept energized in its opening direction and, upon application of an external pressure thereto, the ashtray unit is thrust out of the panel and brought to its service position.

Since the ashtray unit of the device of this invention is readily brought into its service position by one touch of the driver's finger as described above, the driver is relieved of the special care heretofore required in the use of the conventional ashtray and is allowed to devote all his attention to the operation of his automobile even during the use of the ashtray unit.

The other objects and characteristics of the present invention will become apparent from the further disclosure of the invention to be made herein with reference to the accompanying drawings.

DESCRIPTION OF PREFERRED EMBODIMENTS

FIGS. 1 to 5 illustrate one embodiment of the ashtray device according to the present invention, which comprises three principal units. The first unit is an ashtray 1. Like any of the ashtrays in general use, the ashtray unit 1 is provided with a tray 2 for holding ashes and cigarette butts (a box-shaped tray in the illustrated embodiment) and a front plate 3 therefor. In this case, the front plate 3 is fairly large, protruding in the shape of a flange from the four sides of the tray 2. The second unit is a housing 4 for accommodating the ashtray unit 1. As described more fully afterward, this housing 4 is desirably adapted to snap into engagement with the panel surface in which the ashtray device is wholly buried. The third unit is an open-shut control mechanism 5 for the ashtray unit 1. This mechanism 5, interlocked with the tray 2, is used for automatically opening the tray 2 and for keeping the tray 2 in a closed state.

These component parts are produced such as by the injection molding of a plastic material, or from other suitable materials such as metals.

Figure 3:
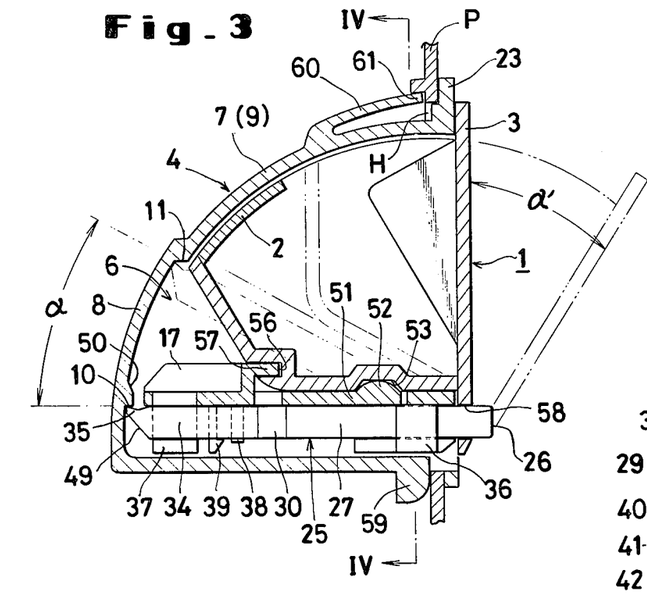
FIG. 3 is a lateral cross section of the ashtray device of FIG. 1.
Figure 4:
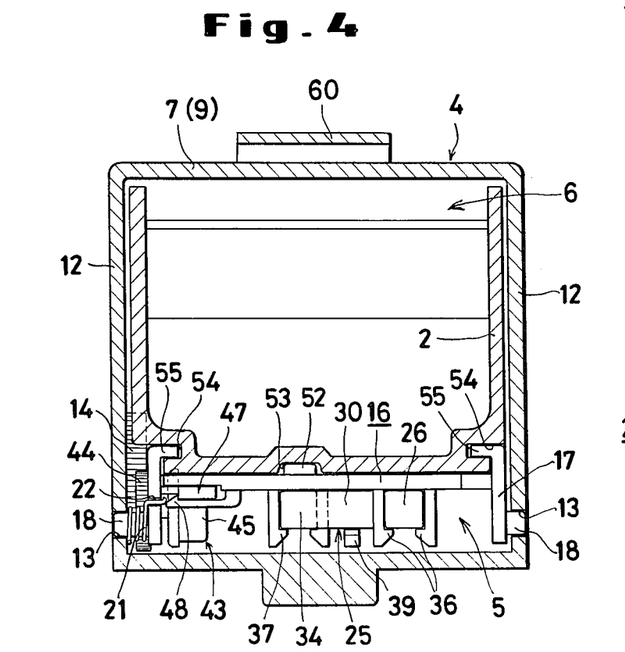
FIG. 4 is a sectioned view taken along the line IV—IV in FIG. 3.

The housing 4 is in the shape of a box, having an inner hollow portion 6 with a front opening 6'. From its top plate 7 through its rear wall 8, the housing forms a continuously curved wall 9 conforming to the locus described by the tail ends of the tray and the control mechanism during the rotary ascent of the tray which is described in detail in a later paragraph. The curved wall has its significance in avoiding wasteful use of material. On the inner surface of this rear curved wall 9 are disposed an engaging step portion 10 used for keeping the ashtray unit in the closed state and a stopper step portion 11 used for fixing the largest angle of the opening of the ashtray unit. The angle formed by the straight lines drawn to the step portions 10, 11 from the straight line X connecting the centers of the bearing holes 13 formed in the front lower portions of the side walls 12 of the housing constitutes the largest angle of rotation α allowed for the ashtray unit (FIG. 3).

In the innermost recess of one of the side walls of the housing (FIG. 1), there is disposed a curved rack gear 14 extended inwardly, faced forward, and describing an arc with the bearing hole 13 as the center. The interval between the inner lateral wall 15 of the gear and the other side wall 12 substantially constitutes the width of the space for accommodating the control mechanism 5 and the tray 2.

The open-shut control mechanism 5 possesses a base plate 16 which assumes a position substantially parallel to the inner floor of the housing when the ashtray unit is closed. On this base plate 16 are provided various component parts to be described afterward.

On the opposite lateral ends of the base plate 16 are formed lateral walls 17. At the opposite ends of its front side, there are provided symmetrical shafts 18 extended sidewise.

When these shafts 18 are inserted into the bearing holes 13 of the housing 4, the base plate 16 is rotatably attached to the housing 4. To facilitate this insertion, the front parts of the lateral walls 17 are connected to the rear parts thereof only through the hinge portions 20 formed by inserting vertical slits 19. Moving around these hinge portions 20, the front and rear parts can be brought toward each other as though in a squeezing manner. In other words, the distance between the shafts 18 is contracted by this squeeze to permit the insertion of the base plate 16 into the housing interior 6. The squeeze is released when the shafts 18 are registered with the bearing holes 13. Consequently, the front parts of the lateral walls regain their original positions owing to the resilience of the material of the hinge portions 20 and the shafts find their way into the bearing holes. To avoid obstructing this motion of the front parts of the lateral walls, the front part of the base plate has a thin enough width to maintain a space from the front parts of the lateral walls.

In this embodiment, one of the shafts 18 has a coil spring 21 fitted thereon. One end of the coil spring 21 is set in a small groove 22 of the lateral wall 17 of the base plate and the other end thereof is set in a small groove 24 formed in a frame portion 23 beside the front opening 6' of the housing. In this arrangement, the coil spring 21 is allowed to accumulate energizing force therein when the base plate 16 is brought to a position parallel to the inner floor surface of the housing. As a result, the base plate 16 is always kept energized in the direction of urging its tail end around the axis X.

On the other hand, the base plate is provided with engaging means adapted to keep the base plate substantially in its horizontal state (first posture) by being brought upwardly into engagement with the aforementioned engaging step portion 10 against the energizing force mentioned above and release means adapted to release the engaging means and bring the base plate into a tilted state (second posture) by virtue of the energizing force of the energizing means (coil spring) 21.

Figure 1:
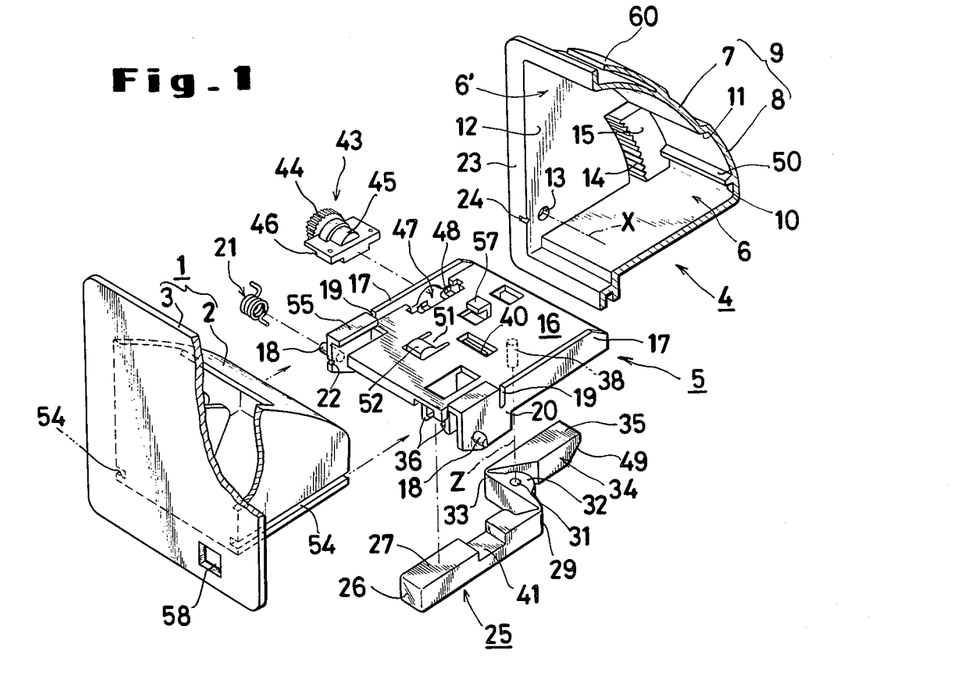
FIG. 1 is a partially cutaway exploded perspective view of the first embodiment of the ashtray device according to this invention.
Figure 2:
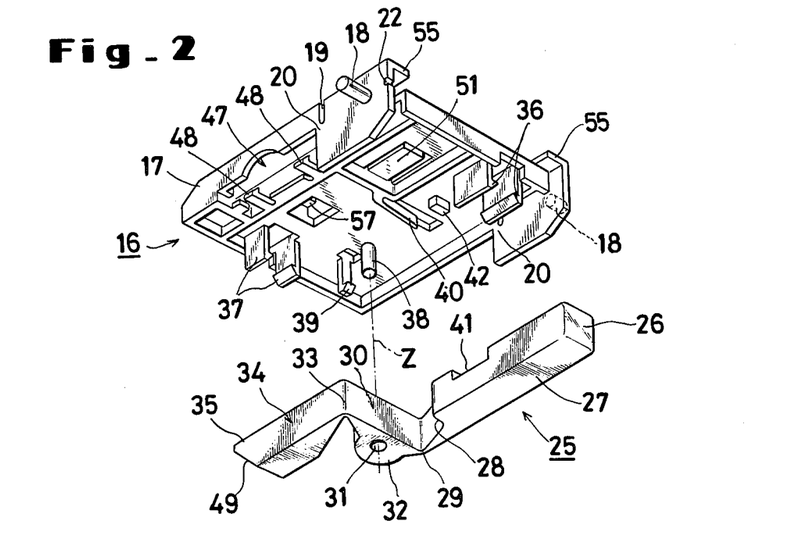
FIG. 2 is a perspective view illustrating the relation between the base plate unit and the link in the ashtray device of FIG. 1.

In the present embodiment, the engaging means and a push button, serving as the operating member the driver is required to use in releasing the engaging means, are formed on a link 25 obtained in a one-piece form by one-shot molding of a plastic material. This link 25 is operably attached to the rear surface of the base plate 16. Reference to the perspective view of FIG. 2 showing the rear surface of the base plate 16 will facilitate comprehension of the working of the link to be described below.

The push button portion 26 which the driver is required to depress when he wishes to open the ashtray is formed at the leading end of the first link rod 27. At the tail end of the first link rod, the engaging surface 28 with which the link-resetting spring to be described in detail afterward comes into contact is formed in the shape of a step. The rear end portion of the first link rod which departs from this step in a converging state is flexibly connected to the second link rod 30 through the medium of a thin-walled hinge 29.

While the link 25 remains out of service, the first and second link rods 27, 30 are bent at the hinge 29 substantially at right angles relative to each other. The second link rod 30 is provided with a cylindrical portion 32 containing a suitably diverged perforation 31 in the vertical direction.

To the other end of the second link rod 30, a third link rod 34 is connected via a hinge 33. The second and third link rods 30, 34 are similarly connected to each other substantially at right angles when the link is out of service. The third link rod 34 extends in the opposite direction with reference to the first link rod 27. When the link 25 is so positioned that the push button portion 26 at the leading end of the first link rod 27 falls on the front side, an engaging surface 35 with which the engaging step portion 10 and the stopper step portion 11 of the housing selectively come into contact is formed on the upper surface of the rear end of the third link 34.

The attachment of the link 25 to the base plate 16 can easily be effected by keeping the base plate upside down and lowering the link 25 from above and bringing its component parts into engagement with the matched parts of the base plate. To be specific, the first and third link rods 27, 34 are dropped into the space between the pair of hooks 36, 37 which are opposed to each other and raised at matched positions on the rear surface of the base plate. Then, the link rods are advanced past the hooks 36, 37 while the claw-like width-contracted portions of the hooks 36, 37 are both pushed away from each other. Then, the hooks 36, 37 are allowed to regain their original shape by virtue of the resilience of their own material. Consequently, the link rods are secured to the base plate because the claws of the hooks catch firm hold of the lower sides of the link rods. At this point, the vertical perforation 31 in the second link rod 30 slides on a shaft 38 provided on the rear side of the base plate portion, giving rise to the axis Z as the center of rotation for the second link rod 30. Further, to prevent the second link rod 30 from falling off in the downward direction, the base plate portion is provided with a hook 39 adapted to support the lower side of the cylindrical portion 32.

When the hooks 36, 37, 39 cooperate to support the link 25 in position as described above, the first and third link rods 27, 34 are allowed to slide in their longitudinal directions along the inner surfaces of the corresponding hooks and the second link rod 30 is allowed to rotate around the axis Z. When the link 25 is fastened as described above, the leading end of a cantilever leaf spring 40 provided on the base plate collides with the engaging surface 28 at the tail end of the first link rod and energizes it toward the front. Consequently, the push button portion 26 at the leading end of the first link rod protrudes past the base plate and the engaging surface 35 at the leading end of the third link rod 34 whose movement is reversed through the medium of the second link rod protrudes past the rear edge of the base plate (FIG. 5(A)).

Figure 5A:
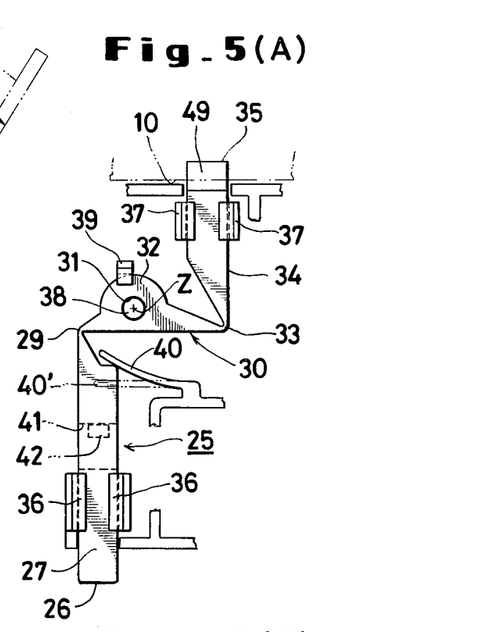
FIG. 5(A) is an explanatory diagram illustrating the condition which is assumed when the link in the ashtray device of FIG. 1 is not operated.

In other words, for the leaf spring 40 to manifest its energizing force already in the existing non-operative condition (the condition in which the driver's finger is not exerting pressure on the push button), the component parts of the device must be given sizes such that the leaf spring, when assembled, assumes a state slightly bent backwardly with reference to the state 40' assumed at the end of the molding indicated by the chain line in FIG. 5(A). In order that the ends of the first and third link rods may not be pushed out excessively by the energizing force of the leaf spring 40 retained in the state illustrated in FIG. 5(A), namely that the first, second, and third link rods may retain the relationship of being at substantially 90° to one another, it is desirable that the rear wall of a longitudinal groove 41 provided on the upper surface of the first link rod 27, for example, should come into contact with a stopper projection 42 on the rear surface of the base plate when the link rods assume the desired postures.

From the standpoint of the fabrication of the molding die to be used, the link 25 is desired to be injection molded in such a shape that the first, second, and third link rods will lie in a straight line in the die. In the course of the subsequent assemblage, the three portions of the straight link destined to form the link rods can be bent at angles of 90° in the prescribed directions.

Another component part to be provided for the base plate 16 is a rotary damper device 43. The rotary damper device 43 serves the purpose of applying suitable restraint to the rotary shaft of the gear 44 thereby retarding the motion produced by virtue of the rotation of the gear 44. Various types of dampers, some using mechanical friction and some others making use of oil-damping, are available. The damping devices which are disclosed in Japanese Utility Model Public Disclosure No. 56002/1981 and Japanese Utility Model Application No. 82888/1980 to be laid open to public inspection shortly are concrete examples.

The particular damping device used in the present embodiment is of the oil-damping type marketed by the assignee of the present patent application. Comprising a cylindrical housing 45 of a plastic material for admitting the rotary shaft of the gear 44, vanes or a disc fitted radially around the rotary shaft inserted into the cylindrical housing 45, and silicone oil filling the interior of the cylindrical housing 45, this damping device provides required damping by virtue of the resistance derived from the viscosity of the oil. It suffices to have this damping device 43 designed so that the gear 44 is accurately meshed with the rack gear 14 inside the housing 4 when the housing 45 of the damper device 43 is attached to the base plate 16 and the base plate 16 is incorporated into the housing 4. The damper device 43 is provided along the periphery of the housing 45 thereof with an edge portion 46. In the present embodiment, therefore, a fitting portion 47 comprising a space for accommodating the housing 45 and a space for embracing the edge portion 46 is formed in the lateral wall 17 along one edge of the base plate 16. The damper device 43 is set in position in this fitting portion 47 by being inserted sidewise therein. Particularly since the fitting portion 47 is provided with a pair of hooks 48 adapted to hold up the lower side of the edge portion 46 and catch on the front surface, this fitting work can be simply effected by allowing the damper device 43 to come into snapping engagement with the pair of hooks 48. Otherwise, some other fitting method may be adopted to suit the particular type of the damper device to be used.

After assembly of the control mechanism 5 has been completed as described above, the front parts of the lateral walls of the base plate are bent enough for the base plate to be inserted rearward into the hollow portion 6 of the housing 4, the shafts 18 to be fitted into the bearing holes 13, and the opposite ends of the coil spring 21 to slide into the respective small grooves 22, 24.

In this case, the base plate 16 is inserted as slightly slanted down to the front so that the rear end of the third link rod 34 carrying the engaging surface 35 protruding from the tail end of the base plate will assume its position between the engaging step portion 10 and the stopper step portion 11 on the rear inner wall of the housing. When the upper surface of the base plate is depressed with the hand, the lower slanted surface 49 at the rear end of the third link rod 34 collides with the raised upper surface 50 defining the engaging step portion 10. As the depression by the hand is further continued, the rear end of the third link rod 34 is lowered while being relatively pushed away forwardly by the raised upper surface 50. When the engaging surface 35 at the upper rear end is positionally aligned with the engaging step portion 10, the third link rod is again stretched out by the action of the leaf spring 40 and the engaging surface 35 is hooked on the engaging step portion 10.

As a result, the base plate 16 can be made to assume the substantially horizontal first posture by overcoming the energizing force of the coil spring 21 as illustrated in FIG. 3.

Figure 5B:
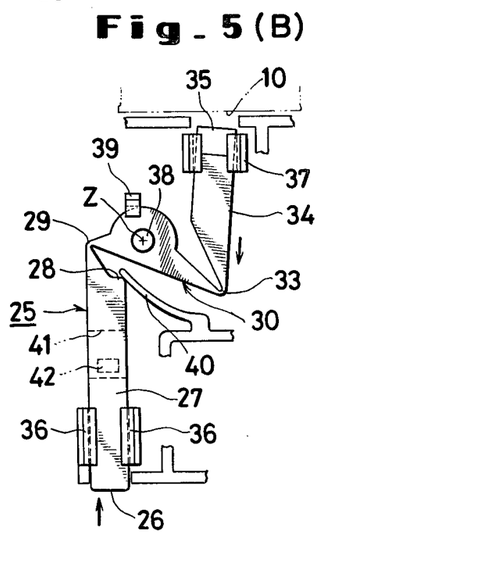
FIG. 5(B) is an explanatory diagram illustrating the condition which is assumed when the link is operated.

When the driver depresses the push button 26 while the first posture is retained, the base plate 16 is caused to leap up by the mechanism illustrated in FIG. 5(B). To be specific, the push button 26 is depressed with a force greater than the energizing force of the leaf spring 40 so that the spring 40 is bent backward and the first link rod is slid backward. Consequently, the second link rod 30 is rotated around the axis Z and the third link rod 34 is pulled forward. The engaging surface 35 is also retracted and released from the engagement with the engaging step portion 10 (FIGS. 5(A), (B)), with the result that the energizing force of the coil spring 21 begins to function and the base plate begins to rise. By the slight pressure which the driver gives to the push button 26 as described above, the leaf spring 40 is actuated in the course of the ascent of the base plate 16 to cause the first link rod to return to its original position, the second link rod to be rotated back to its original position, and the third link rod to slide backward and force the engaging surface 35 to protrude again.

This upward leap of the base plate 16, therefore, is stopped at the time that the engaging surface 35 collides with the stopper step portion 11 after the entire base plate has been rotated around the axis X and slanted by the angle of rotation α. Consequently, the base plate assumes the second posture as indicated by the chain line in the diagram of FIG. 3.

The connecting hinges between the first and second link rods and between the second and third link rods are not those of combined oblong holes and pins as usually found in metallic linkages. Particularly when the operating condition illustrated in FIG. 5(B) is assumed, therefore, the first and third link rods are slightly inclined relative to the axis of the straight motion. This inclination can be absorbed by the resilience of the material of the hooks 36, 37 which serve to press the respective link rods inwardly from the opposite sides. Particularly when the length of the first link rod 27 is increased amply, the driver does not feel any awkwardness in depressing the push button 26 because the angle of this inclination can be decreased and the distance of depression of the push button 26 also decreased.

When the base plate is thrown up by the depression of the push button, if the damping device 43 should be absent, the base plate 16 would be thrown up instantaneously by the abrupt action of the energizing force of the coil spring 21. Consequently, the engaging surface 35 at the tail end of the link would collide with great force into the stopper step portion 11 and, owing to the resultant impact, the base plate 16 would shake and the ashtray disposed on the base plate 16 also would vibrate even to an extent of seriously impairing the user's comfort in the handling of the ashtray device. Worse still, there is a possibility that ashes would be sent flying from the ashtray interior. The damping device is required in order to preclude the sudden leaping of the base plate and the attendant inconveniences. In actuality, since the gear 44 provided on the rotary shaft of the damping device is securely meshed with the stationary rack gear 14, the rotation of the gear 44 is effectively restrained and the upward motion of the base plate is greatly damped, enabling the user to derive the feeling of luxury from the handling of the ashtray device. Inconveniences such as that of ashes being tossed into the air, therefore, can be avoided. The engagement of the gear 44 and the rack gear 14 is not the sole effective means for damping the otherwise possible sudden motion of the base plate. For example, the same purpose can be attained by providing the two members with rubber coats or coarsened surfaces which come into frictional engagement.

Owing to the arrangement described above, the ashtray unit 1 mounted on the base plate 16 can be opened and shut at will. It is important, however, that the ashtray unit 1 should be capable of being easily released from the base plate 16 whenever the user finds it necessary to empty it of ashes and cigarette butts. This requirement can be readily fulfilled by a simple snap-action mechanism. In the illustrated embodiment, this mechanism is formed of a resilient piece 51 provided on the base plate and a recess formed in the bottom plate of the tray 2 of the ashtray unit 1. The resilient piece 51 has one side thereof fastened to the base plate and the remaining sides thereof separated from the base plate by intervening slits, so that the resilient piece 51, because of the resilience of its own material, can be readily bent in the vertical direction with the fastened end thereof as the fulcrum. The resilient piece 51 is further provided thereon with an upward prominence 52. The recess 53 is adapted to admit this prominence 52 completely. The front and rear surfaces of the prominence 52 are smoothly sloped so that the resilient piece 51 will easily be bent down whenever a force is applied horizontally thereto from either the front side or the rear side.

Further, the ashtray unit 1 is provided along the lower opposite edges thereof with guide grooves 54 formed in the direction of the innermost recess, whereas the base plate is provided along the opposite edges thereof with inwardly extended guide pieces 55. When the ashtray unit 2 is slid on the upper surface of the base plate and pushed in with the guide grooves 54 fitted into the guide pieces 55, the rear part of the bottom of the tray will collide with the front surface of the prominence 52. When the insertion is further continued despite the slight resistance offered by the prominence 52, the prominence yields to the pressure and dips and eventually finds its way into the matching recess 53. By the resilience of the resilient piece 51, the prominence 52 finally fits completely into this recess 53. The relevant parts of the ashtray unit 1 and those of the base plate are given sizes such that the front plate 3 of the ashtray unit 1 will collide with the frame portion 23 surrounding the opening of the housing precisely at the time that the prominence 52 snaps into the recess 53. Further for the purpose of avoiding excessive insertion of the ashtray and effectively keeping the ashtray from randomly rising, there may be provided a retainer piece 57 adapted to be inserted into the groove 56 in the rear part of the tray in addition to the guide pieces 55. The front plate is provided with an opening 58 through which the push button 26 passes.

When the tail end of the base plate is caused to leap upwardly as described previously by the depression of the push button while the ashtray is set in position on the base plate 16 as described above, the ashtray unit 1 as a whole is rotated at the same time to open the front surface of the tray 2 with reference to the opening of the housing. Through the gap (as indicated by the chain line in FIG. 3) thus produced, the user is free to drop ashes and cigarette butts into the ashtray. At this time, the angle of rotation $\alpha'$ of the ashtray unit is identical with the angle of rotation $\alpha$ of the base plate portion. Thus, the opening angle of the tray can be adjusted depending on the position of the stopper step portion 11 relative to the engaging step portion 10.

The closure of the ashtray can be accomplished simply by pushing the front plate 3 of the ashtray in the direction of the housing 4. In consequence of the push, the base plate 16 lowers itself by the action described already and comes into contact with the engaging step portion 10 and resumes its original state after the engaging surface 35 of the link 25 has ridden over the upper surface of the engaging step portion 10.

The removal of the ashtray from the housing can be accomplished by drawing the entire ashtray forward with a force enough for the stationary prominence 52 to bend downwardly. This removal of the ashtray can be effected more advantageously while the ashtray is kept in its opened state, because the user can get better hold of the front plate 3 when the ashtray is open than when it is kept shut.

The housing 4 is secured within an opening H formed in the panel P of the automobile as illustrated in FIG. 3. Although the method used for the attachment of the housing to the panel has no direct bearing upon the present invention, the attachment can be accomplished very conveniently by a simple snap action as illustrated in the drawing.

Specifically, from the lower surface of the housing 4, a rib 59 adapted to nip the edge of the opening H in the panel P against the lower rear surface of the front frame portion 23 is raised. First, the housing 4 held aslant is inserted into the opening H. Then, at the time that the edge of the opening is nipped between the rib 59 and the front frame portion 23, the upper end of the housing is rotated about the nipped edge as the fulcrum while the resilient engaging piece 60 provided on the upper surface of the housing and extended upwardly to the front is bent down and forced past the edge of the opening. At the time that the front frame portion 23 comes into contact with the front surface of the panel, the resilient engaging piece 60 is allowed to regain its original shape by slipping past the opening, with the result that the edge of the opening is nipped fast between the leading end 61 and the front frame portion. It should be noted, however, that the construction just described is not the sole measure available for the attachment of the housing to the panel. Optionally, the attachment may be effected by means of well-known plastic fasteners provided on the front frame portion 23 or by means of setscrews, for example.

Another embodiment of the ashtray device according to the present invention will be described with reference to FIGS. 6-10.

Figure 6:
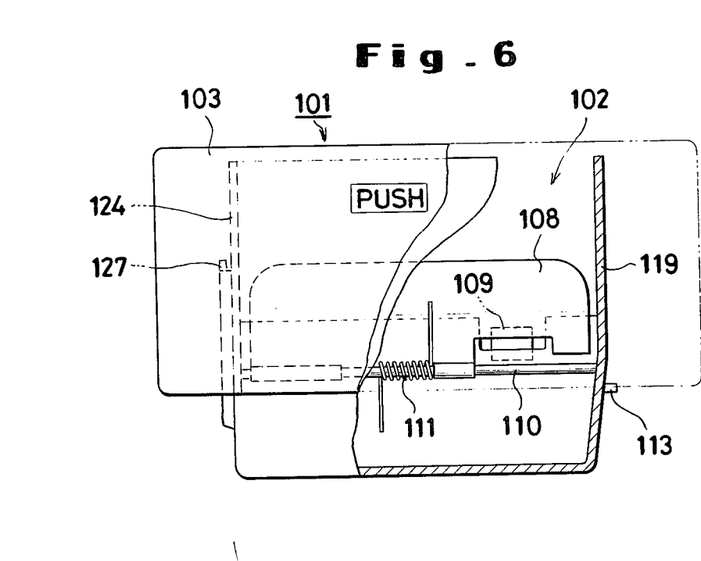
FIG. 6 is a partially cutaway front view illustrating the ashtray unit of the second embodiment of the ashtray device of the present invention.
Figure 7:
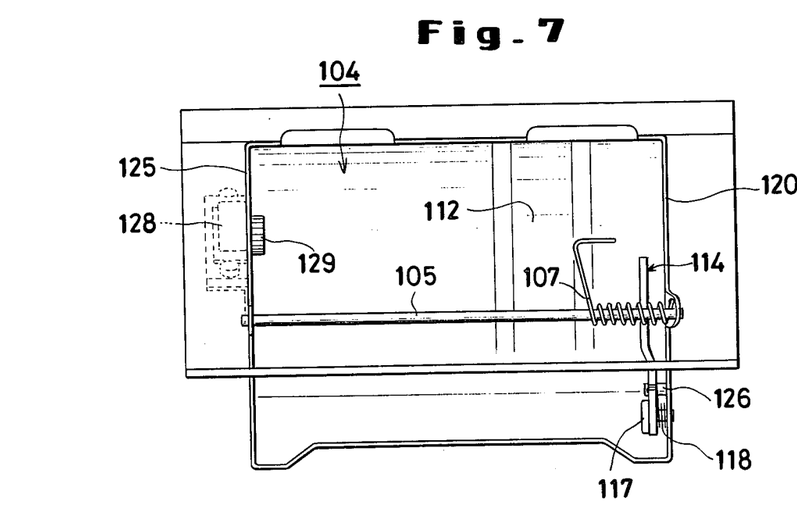
FIG. 7 is a front view illustrating the housing of the second embodiment.
Figure 8:
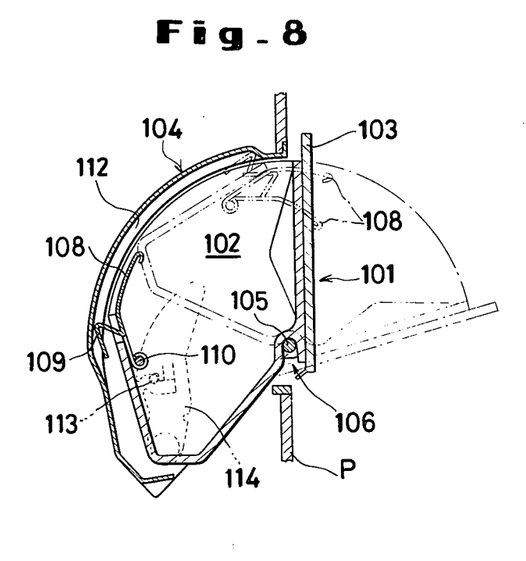
FIG. 8 is a cross sectional side view illustrating the ashtray device having the ashtray unit of FIG. 6 accommodated in the housing of FIG. 7.

FIG. 6 illustrates an ashtray unit 101 which comprises a front plate 103 and a tray 102. A housing 104 for accommodating the ashtray unit 101 is illustrated in FIG. 7. The ashtray device comprising the ashtray unit 101 and the housing 104 allows the tray 102 to be opened by application of pressure to the front plate 103 of the ashtray unit. The tray 102 has the upper ends of the side walls thereof formed in the shape of an arc and is provided in the front lower portion thereof with a groove 106 (FIG. 8). The housing 104 is provided on the front lower portion thereof with a shaft 105 which extends across the housing with its ends supported by the side walls 120 and 125 of the housing. By fitting the shaft 105 of the housing into the groove 106 of the tray, the ashtray unit is attached within the housing so as to rotate around the shaft as illustrated in FIG. 8. The ashtray unit is at all times given energizing force by a spring 107 provided on the shaft 105 so as to rotate in the opening direction. On the inside of the rear wall of the tray 102, there is provided a swing plate 108 swingable around a shaft 110. The swing plate is at all times given energizing force by a spring 111 so as to be kept in an upright position. Provided on the rear surface of the swing plate 108 is a projection 109 which is slidably fitted in a groove 112 formed in the arc-shaped inside wall of the housing. When the tray is in the state of use, the projection 109 collides against the upper end portion of the groove 112, thereby preventing the ashtray unit from being rotated further in the opening direction. In taking the ashtray unit out of the housing for the purpose of cleaning etc., the swing plate 108 is pushed down against the energizing force of the spring 111, with the result that the projection 109 is kept in position inside the rear surface of the tray as illustrated by a chain line in FIG. 8. That is to say, the collision of the projection against the upper end portion of the groove 112 is released. Therefore, the ashtray unit is further rotated around the shaft 105 and can be taken out of the housing 104 by releasing the shaft 105 from the groove 106.

Figure 9A:
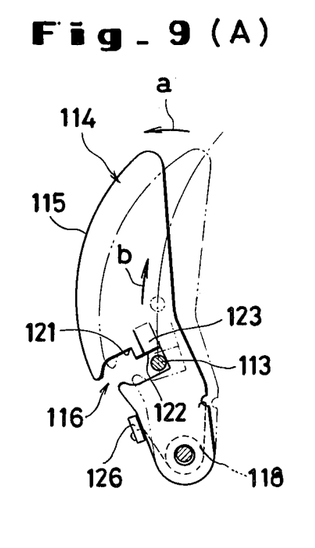
FIG. 9(A) is a side view illustrating the state of movement of the arm in the movement of the ashtray unit of the second embodiment from the closed posture to the open posture.
Figure 9B:
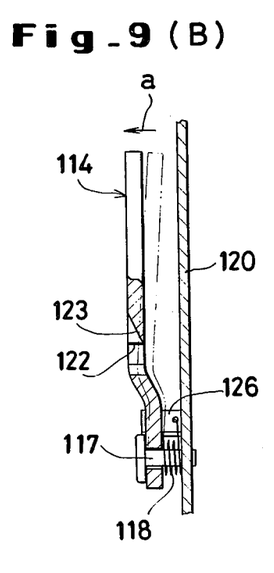
FIG. 9(B) is a front view showing the arm of FIG. 9(A).
Figure 9C:
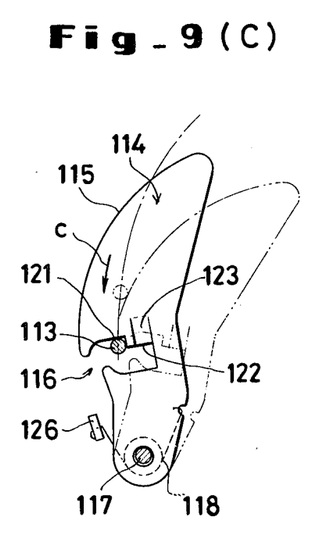
FIG. 9(C) is a side view illustrating the state of movement of the arm in the movement of the ashtray unit of the second embodiment from the open posture to the closed posture.
Figure 10:
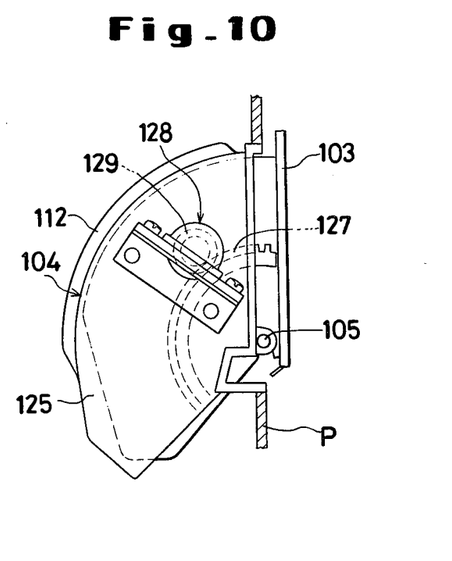
FIG. 10 is a left side view illustrating the ashtray device of the second embodiment.

The tray 102 has its one side wall 119 provided with a protuberance 113 which protrudes outwardly. The corresponding side wall 120 of the housing has an arm 114 to be engaged with the protuberance 113 formed on the inner side thereof. The arm 114 has a gentle arc portion 115 formed on the rear edge side thereof and a notch 116 with first and second stepped engaging portions 121 and 122 formed in the lower end of the arc portion 115, as illustrated in FIG. 9(A). When the arm is seen from the front side, as illustrated in FIG. 9(B), the upper portion from the notch of the arm is bent to be apart from the side wall 120 of the housing further than the lower portion from the notch of the arm. The arm is supported at the lower end thereof by the side wall 120 of the housing so as to be rotatable around a shaft 117 and, as indicated by arrows "a" in FIGS. 9(A) and 9(B), it is given at all times energizing force, though weak, by a spring 118 in the directions toward a stopper 126 formed on the side wall 120 and apart from the side wall 120. The second engaging portion 122 of the notch 116 is connected to a guide groove 123 extending upwardly to have its depth decreased gradually in the upward direction.

The other side wall 124 of the tray 102 is provided with a rack gear 127 describing an arc with the groove 106 as the center and the corresponding side wall 125 of the housing 104 has a damping device 128 fixed to the outer side thereof. The damping device has a rotary shaft piercing into the wall 125 of the housing and having a pinion gear 129 at the leading end thereof. The rack gear 127 and the pinion gear 129 are meshed with each other when the ashtray unit is accommodated in the housing.

In the ashtray device of the construction as described above, the ashtray unit is always given energizing force by the spring 107 so as to rotate in the opening direction and, on the other hand, the protuberance 113 on the side wall 119 of the tray is engaged with the first engaging portion 121 of the notch 116 formed in the arm 114 of the housing so as to prevent the protuberance from moving upwardly and therefore, the ashtray unit is accommodated in the housing.

When the front plate 103 is slightly pushed in for use of the tray, the protuberance 113 is slightly moved downwardly because there is a small space between the panel P and the front plate 103. As a result, the arm 114 is slightly rotated since it is always given energizing force by the spring 118 in the direction of the stopper 126 side and the protuberance 113 comes into engagement with the second engaging portion 122 as illustrated in FIG. 9(A). However, since the second engaging portion is connected to the guide groove 123, the protuberance 113 moves upwardly along the guide groove and pushes the arm 114 gradually toward the side wall 120 side as illustrated by the chain lines in FIGS. 9(A) and 9(B) and consequently disconnects the contact with the arm 114, with the result that the arm 114 is returned to its original position. The upward movement of the protuberance 113 (arrow "b" in FIG. 9(A)) allows the ashtray unit to rotate around the shaft 105. The rotation of the ashtray unit continues until the projection 109 of the swing plate 108 collides against the upper end portion of the groove 112 of the housing and, upon completion of this rotation, the tray is in the state of use. Since the rack gear 127 of the ashtray unit and the pinion gear 129 of the damping device 128 of the housing are engaged with each other, at this time, the rotation of the ashtray unit proceeds slowly as in the first embodiment. Therefore, the ash and dust in the tray do not scatter during the rotation of the ashtray unit.

The ashtray unit 101 is accommodated in the housing 104 by pushing the front plate 103 of the ashtray unit to the housing. This pushing operation allows the protuberance 113 to descend as indicated by the chain line in FIG. 9(C). The protuberance, during its descent, comes into contact with the arc portion 115 of the arm 114 to push the arm in the direction (arrow "c" in FIG. 9(C)) opposite the direction in which the arm is energized by the spring 118 until it is engaged with the first engaging portion 121 of the notch 116 (FIG. 9(C)). When the protuberance is engaged with the first engaging portion, if the pushing force to the front plate is released, the protuberance 113 cannot be moved upwardly. Thus, the ashtray unit is kept in the state wherein it is accommodated in the housing.

As described in detail above, the present invention enables the ashtray to be opened very conveniently and safely without compelling the user to grope for the ashtray with a burning cigarette held between his fingers. It also adds notably to the feeling of luxury of the ashtray itself and enhances the commercial value of the ashtray in line with the recent trend toward high quality.

In the embodiments described above, the open-shut mechanism is based on the rotation of the ashtray unit by utilization of the pushing operation. Of course, this mechanism can be optionally modified without departing from the spirit of the invention. For example it may be based on the sliding motion of the ashtray unit by utilization of the pushing operation.

What is claim is:

1. A pivotally retractably extendible ashtray device comprising: a housing; an ashtray unit removably securable within and partially rotatable relative to said housing, said ashtray unit pivotally affixable to, disposable within and extendible from said housing; track means carried by said housing and engageable by said ashtray unit for guiding rotative motion of said ashtray unit between open and closed postures relative to said housing; a first spring disposed within said housing for urging said ashtray unit out of said closed posture; restraint means carried by one of said ashtray unit and said housing and engageable with the other one of said ashtray unit and said housing for resisting said urging of said first spring upon said ashtray unit thereby maintiaining said ashtray unit in said closed posture; restraint-removal means disposed within said housing for disengaging said restraint means from said other one of said ashtray unit and said housing thereby causing said first spring to urge said ashtray unit out of said closed posture; means disposed within said housing for regulating said rotative motion of said ashtray unit between said open and closed postures; means disposed within said housing for dampening said urging of said first spring relative to said ashtray unit, said dampening means coacting with said first spring and said regulating means; and a second spring disposed within said housing and engageable with one of said restraint means and said restraint-removal means for causing said restraint means to re-engage with said other one of said ashtray unit and said housing, whereby said ashtray unit is rotatably extendible from and retractable within said housing.

2. The ashtray device of claim 1 wherein said ashtray unit is snap engageable with and snap disengageable from said housing.

3. The ashtray device of claim 1 wherein said regulating means comprises: and arcuate rack gear carried by said housing; and a pinion gear carried by said ashtray unit and engageable with said first spring and said dampening means, said pinion gear meshing with said rack gear for effecting rotational dampening of said ashtray unit relative to said housing for thereby controlling said rotative motion.

4. The ashtray device of claim 1 wherein said restraint means is pivotally connected to said restraint-removal means.

* * * * *